United States Patent Office 3,358,472
Patented Dec. 19, 1967

3,358,472
METHOD AND DEVICE FOR COOLING SUPERCONDUCTING COILS
Gustav Klipping, Berlin, Germany, assignor to Max-Planck Gesellschaft zur Forderung der Wissenschaften e.V., Gottingen, Germany, a registered association.
Filed Jan. 21, 1966, Ser. No. 522,313
14 Claims. (Cl. 62—514)

ABSTRACT OF THE DISCLOSURE

The superconducting coil of an electromagnet cryostat is coaxially surrounded by an evaporator formed of a bifilar helical tube winding and both are mounted in an evacuable container inserted with radial clearance in an evacuable housing. A gaseous heat exchange medium, preferably gaseous helium, is supplied under constant pressure to the interspace between coil and evaporator in the container. Liquid cryogenic medium, preferably helium, is circulated through the evaporator and thus cools the gaseous medium while remaining separated therefrom in the container. A radiation shield formed by another helical bifilar winding of tubing surrounds the evaporator or container and is traversed by the liquid cryostatic medium passing through the evaporator.

Specification

Figure 1:
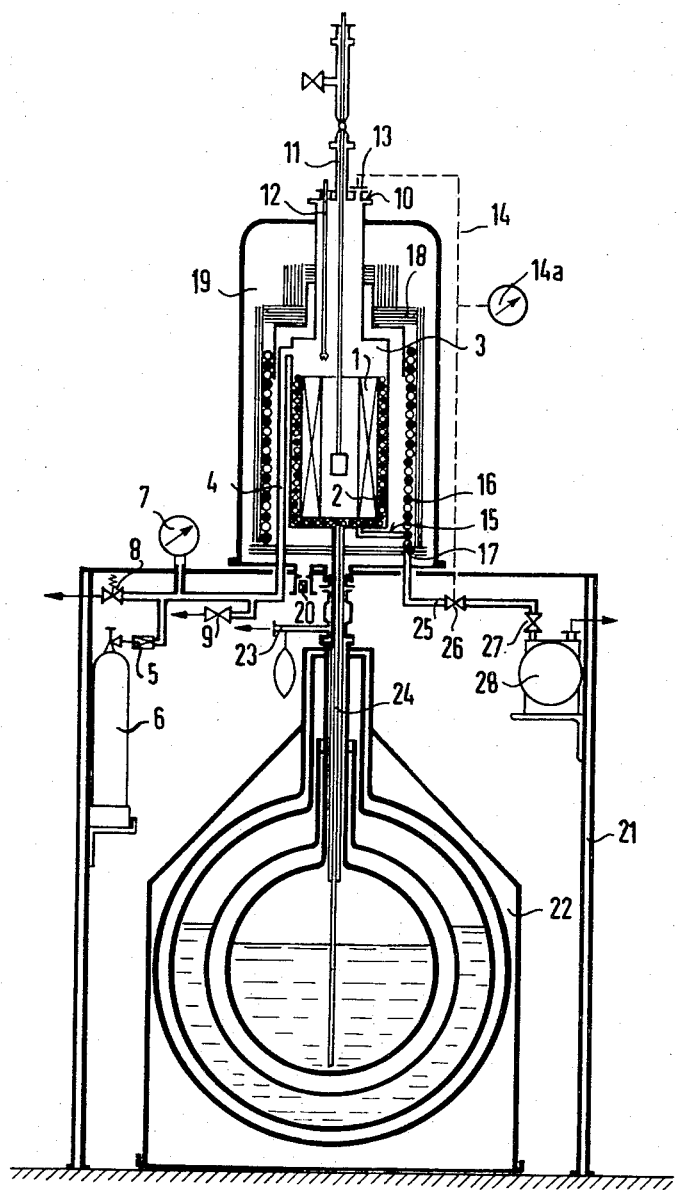

My invention relates to methods and devices for cooling superconducting coils below the critical temperature of the coil material by evaporating a cryogenic medium, preferably liquid helium. Devices of this type, incorporating a superconducting electromagnet or solenoid, have become known as electromagnet cryostats.

Cooling superconducting coils below the critical temperature poses difficult technological problems if a simple and reliable construction of the cryostat, as well as a continuous economical operation with minimal consumption of cryogenic medium at a given low temperature, is to be achieved. Although the critical temperatures of the wire materials presently employed for technical magnet coils, namely about 17 to 15° K., are relatively high, the magnetical behavior of the materials makes it necessary in practice to stay considerably below these critical temperatures. At the present state of the art, therefore, only liquid helium is applicable as cryogenic medium for superconducting coils. While current research and development aim at providing wire materials of considerably higher critical temperatures, so far no such materials have become applicable for technical magnet coils.

Helium, even if purchased in the gaseous state, is a rather expensive starting material. Liquefying the gas greatly adds to the cost. Hence, cooling methods using liquid helium are generally costly for other than laboratory purposes. This makes it desirable that in such cooling devices the consumption of cryogenic medium be reduced to the greatest possible extent. This particularly applies to the cooling of superconducting coils whose winding and housing conjointly constitute a relatively large mass which must be cooled and kept at the low temperature. For example, a 50 kg. coil of about 28 cm. height, having an interior field space of about 5 cm. diameter, has a mass of about 15 kg.

Heretofore, superconducting coils have been cooled by cryostats of conventional design in which the coil winding is immersed in liquid helium within a vacuum-isolated vessel surrounded by a nitrogen-cooled radiation shield, the free inner space of the cylindrical coil being either filled with liquid helium or, with a ring-shaped design of the cryostat, kept at normal room temperature. Cryostats of the latter type are called "hot hole cryostat" in the pertinent literature.

The over-all height of the known cryostats is a multiple of the coil height. This unfavorable dimensional ratio is due to the cooling principle heretofore employed. In order to provide for prolonged operating periods without replenishment of cryogenic media, a rather high liquid level must be maintained above the immersed coil winding. A certain minimal height is also required for preventing or minimizing the conductance of heat through the housing material to the superconducting coil. Sufficiently cooling the coil winding in such a cryostat requires considerable quantities of the costly cryogenic coolant, especially if rather rapid cooling-down periods are desired.

In the known cryostats for superconducting coils, the cold content of the liquid helium is utilized only to a very incomplete extent. Some economical improvement results from precooling the coil-containing vessel by liquid nitrogen before filling the vessel with liquid helium. In practice, however, this precooling method is difficult because the nitrogen must be removed without leaving any residue before filling helium into the vessel. Any nitrogen residue may lead to ice formation and cause clogging of supply and gas outlet tubes. Consequently, after precooling the vessel down to the boiling temperature of nitrogen, the cryostat must be carefully evacuated.

Further disadvantages of the known methods and devices result from the necessity of storing a large amount of liquid helium in order to permit operating the superconducting coil for prolonged periods of time. Thus, for example, any liquid helium remaining in the cryostat upon interruption of the operation must be evaporated. Furthermore, relatively large losses of coolant generally occur when the superconducting coil converts to normal conductance (ohmic resistance) while the impressed high superconductance current still continues flowing during the transition interval. This is accompanied by a short-lasting, intensive generation of heat causing a corresponding vaporization loss of the costly cryogenic medium.

A further disadvantage of the known electromagnet cryostats is the fact that it is virtually impossible to adjust and maintain any constant temperatures above 4.2° K., the boiling point of liquid helium. According to experience, however, the most favorable working temperature of some superconducting coil materials is above 4.2° K.

It is an object of my invention to provide a method and device for cooling superconducting coils, that affords a technologically reliable continuous operation at a variable, preselective temperature above 4.2° K., and which also affords an optimal utilization of the cold content of the liquid cryogenic medium.

Another object of my invention is to provide an electromagnet cryostat of compact design and relatively small dimensions which does not require a radiation shield cooled with liquid nitrogen.

An object of the invention is also to devise a method and apparatus capable of cryogenically cooling superconducting coils in a considerably more economical manner than possible with the known cryostats.

Still another, more specific object of the invention is to devise an electromagnet cryostat having a very slight dead volume so that, in the event of interruption or stoppage of the coil operation, only slight quantities of cryogenic medium will be lost.

A further object of the invention is to provide an electromagnet cryostat which, aside from meeting one or more of the objects stated above, affords pressure protection so that abrupt or excessive increases in pressure, as may occur when the superconducting coil suddenly goes normal, are rendered harmless with respect to the cryostat device as well as to the person using it.

It is further among the objects of my invention to afford the possibility of giving the electromagnet cryostat a great variety of selectively applicable constructional designs for various applications, for example a cryostat design with an inner coil space free of liquid helium (hot hole), cryostats with a horizontal coil arrangement, or cryostats whose coil winding can be turned during operation from a vertical to a horizontal position.

To achieve these objects and in accordance with one of the features of my invention, the winding of the superconducting coil is mounted in an enclosed and evacuable insert container which is filled and replenished with a fluid heat transfer medium, preferably helium. Furthermore, an evaporator structure is mounted in the insert container for cooling the heat transfer medium, preferably down to liquefication of the medium, the evaporator structure being operative by evaporation of liquid cryogenic medium, preferably also helium. The path or circulation system of the liquid cryogenic medium in the evaporator structure is separate from the supply of heat transfer medium in the insert container.

The cold-generating power of the evaporator, connected through a suction line to a vacuum pump, is preferably controlled by a throttle valve which controls the suction power of the vacuum pump in dependence upon the temperature in the vicinity of the evaporator structure (published German patent application DAS 1,161,570).

According to further features of my invention it is in some cases of advantage to have the insert container connected through a supply conduit line with a supply control means for the heat transfer medium, the supply control means comprising a control valve or other control member which maintains the gas pressure in the insert container at least approximately constant at a preselected value as the gaseous transfer medium is being filled into the insert container.

In a cryostat device according to the invention the coil winding in the insert container is cooled by heat exchange with the heat exchange medium; and the cooling of the heat exchange medium and consequently of the coil, is effected by the evaporation of the cryogenic medium inside the evaporator structure which forms part of a coolant circulation system separate from the heat transfer medium. The use of gaseous helium as heat transfer medium is known for cryogenic calorimetry in which case, however, a specimen container is simply immersed in a bath of helium, the specimen container being either highly evacuated or filled with helium to act as heat transfer medium.

Using an apparatus as described above, my invention also resides in a method briefly outlined as follows:

With the superconducting coil and an evaporator disposed in a container such as an insert container within a jacket or housing, I supply a gaseous heat-exchange medium to the container and maintain the gas at constant pressure. Simultaneously I cool the heat exchange medium in the container, as well as the superconducting coil in heat-exchanging contact with the medium, by evaporating a cryogenic liquid in the evaporator. The lowered temperature thus reached in the insert container causes the heat exchange gas in the container to condense. This tends to reduce the gas pressure, but a sufficient amount of gaseous heat transfer medium is continuously being added to the interior of the insert container to prevent the pressure from dropping below the predetermined value. This pressure value is determined by the temperature to be adjusted and is always higher than 1 atmosphere.

With this method, it is often desirable to regulate the cooling power of the evaporator after the heat transfer medium in the insert container has reached the desired low datum temperature. Such regulation is effected in dependence upon a variable state of the heat transfer medium in the insert container in such a manner that the temperature of the superconducting coil winding is maintained approximately constant at an adjustable value. This regulation of the cooling power affords adjusting and maintaining a desired constant temperature above the boiling point of liquid helium (4.2° K.) or above the critical point of helium (5.2° K.), thus permitting a satisfactory and reliable operation at any optimal operating temperatures of superconducting coils.

For reducing the operating cost, the method of cooling the superconducting coil may be effected in steps. For this purpose, the method is performed by first cooling gaseous heat exchange medium in the container by evaporating in the evaporator a cryogenic coolant of relatively high boiling temperature, preferably nitrogen. Thereafter, a second reduction in temperature is effected by evaporating in the evaporator a coolant of lower boiling temperature, such as helium.

Figure 2:
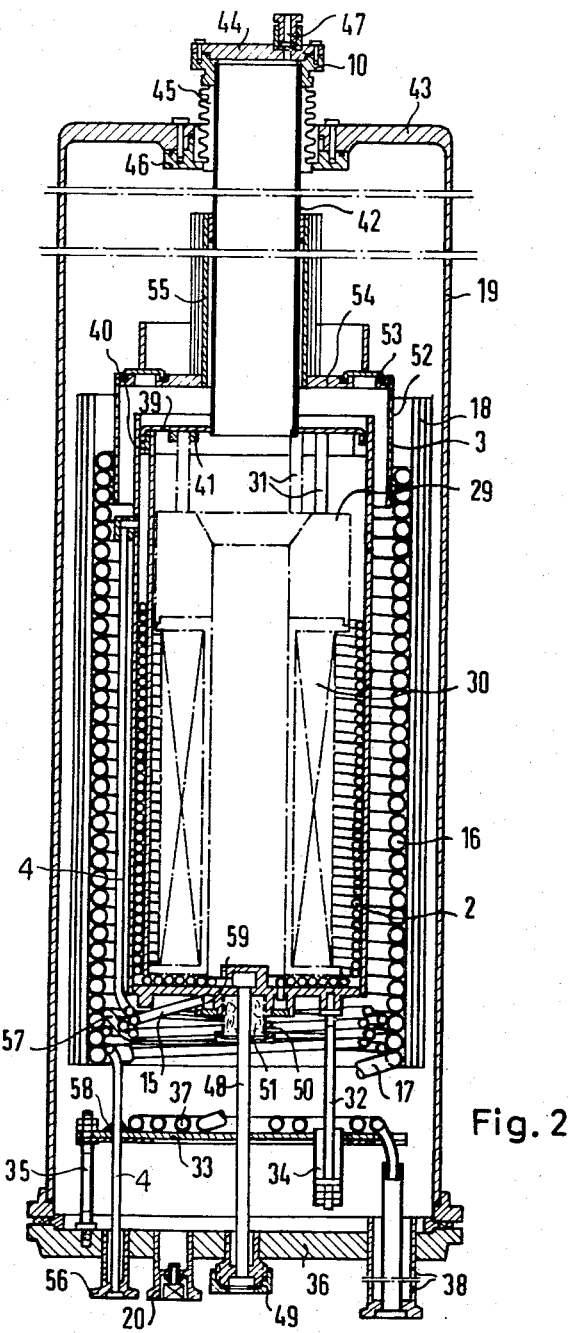

The invention will be further described with reference to an embodiment of an electromagnet cryostat according to the invention illustrated by way of example on the accompanying drawing in which:

FIG. 1 is a longitudinal section through the device mounted on top of a helium storage vessel; and FIG. 2 is a section through part of the same device.

The device comprises a hollow cylindrical superconductor coil 1 surrounded by an evaporator 2 made of tubing which is wound to a bifilar helical winding in the shape of a cup structure. The coil 1 and the evaporator 2 are located in a cylindrical container 3 which is inserted with ample clearance into a coaxial outer jacket or housing 19 and communicates through a gas supply line 4 with a control device 5 with whose aid an adjusted or regulated flow of helium gas is supplied from a bottle 6 to the space between the coil 1 and the evaporator 2 in the insert container 3, the fill-in pressure being indicated by a pressure measuring instrument 7. A safety valve 8 for protection from overpressure in the insert container 3 connects the supply line 4 and thus container 3 to a helium recovery plant (not illustrated). A shut-off valve 9 further connects the line 4 to a vacuum pump (not illustrated).

The upper end of the insert container 3 is provided with a flange 10 carrying a device 11 for inserting specimens into the magnetic field inside the superconducting coil 1. Also mounted on the flange 10 are a sensor 12 for level indication, and a connector nipple 13 for attachment of a control line 14. During operation of the cryostat the heat transfer medium supplied as a gas to the insert container 3 is cooled by the evaporator 2 until condensation occurs; and the sensor 12 then permits supervising the resulting liquid level of the heat transfer medium. Preferably used as sensor 12 is a resistance spiral whose electrical resistance changes considerably when the spiral becomes immersed in liquefied heat transfer medium.

The evaporator structure 2 is connected through a gas outlet line 15 to a radiation shield 16 likewise consisting of tubular material and forming a bifilar helical winding which surrounds the container 3 and whose gas outlet 17 is connected with the above-mentioned helium recovery plant (not illustrated).

The radiation shield 16, together with the insert container 3, is surrounded by layers of so-called superinsulation 18 constituted essentially by several winding turns of thin metallized foils with intermediate air spaces. The housing 19 which encloses the entire assembly described so far, is sealed and can be evacuated for additional heat insulation. For this purpose, a connecting nipple 20 with a valve permits connecting the interior of the housing 19 to the same vacuum pump (not shown) to which the above-mentioned valve 9 is connected.

The housing 19 is mounted on a support 21 beneath which the storage vessel 22 for liquid helium is located.

The storage vessel 22 has a flanged outlet nipple 23 for connection to the above-mentioned helium recovery plant.

A vacuum-insulated riser tube 24 extends from below the liquid level in storage vessel 22 to the inlet of the tubular evaporator 2 whose gas outlet side is connected to the inlet of the radiation shield 16. The gas outlet 17 of the shield 16 is connected through an evacuating line 25, a pressure-controlled regulating valve 26 and a throttle valve 27 with a second vacuum pump 28 operating as an impeller in the helium circulatory system. The outlet of pump 28 is connected to the helium recovery plant.

The above-mentioned control line 14 forms part of a vapor-pressure thermometer and is connected to an indicating instrument 14a and to the above-mentioned regulating valve 26. The instrument 14a responds to the vapor pressure in the interior of the insert container 3 thus permitting the temperature in the container 3 to be measured and indicated. It will be understood that instead of a pressure line 14, an electrical temperature regulator with an electrical temperature sensor may be provided to act upon an electromagnetic valve 26.

Further, details of the electromagnet cryostat will now be described with particular reference to FIG. 2. As this illustration shows, the cup-shaped bifilar tube winding of the evaporator structure 2 surrounds the superconductive coil 1, which is composed of a coil carrier 29 and a coil winding 30 seated upon the carrier 29. Centering pieces or spacers 31 hold the coil in position. The insert container 3 enclosing the evaporator 2 and the coil 1 is supported by rods 32 of poor heat conductance serving as heat throttle members. The pins enter into tubular members 34 inserted into a cooled carrier plate 33. The plate 33 rests on rods 35 of poor heat conductance which, like the rods 32, are symmetrically distributed about the axis of the supported parts. The lower ends of rods 35 engage respective holes in a base plate 36. A spiral 37 of tubing connected to the gas outlet 17 of the radiation shield 16, is mounted on the carrier plate 33 for cooling this plate. The outlet of the cooling spiral 37 leads to a vacuum-jacketed connecting flange 38 which, according to FIG. 1, communicates with the vacuum pump 28 operating as a propulsion pump in the cryogenic flow path or circulation system.

The top of the insert container 3 is closed by a cover 39 inserted into an immersion-soldered seal 40' which can be opened by application of heat. The cover 39 is provided with centering rings 41 engaged by the above-mentioned centering pieces 31 for the superconductor coil 1. The cover 39 further carries a centrally located charging tube 42 of poor heat conductance through which the interior of coil 1 is accessible for insertion and removal of specimens to be subjected to the magnetic field.

The charging tube 42 extends through a cover plate 43 of the housing 19 and is gas-tightly sealed by means of an O-ring-seal closure plate 44. A movable connection comprising a spring bellows 45 is provided between the cover plate 43 and the charging tube 42 to facilitate adjustment and for equalization of thermal elongation. The bellows 45 has one end fastened to a flange 10 at the top end of the charging tube 42. The other end of the bellows is connected to a ring 46 gas-tightly joined with the cover plate 43.

The closure plate 44 of the charging tube 42 has a ring-seal nipple 47 through which the sensor 12 (FIG. 1) of the level indicator can be stuck, the nipple then being sealed. Likewise provided in the closure plate 43 are the terminals for the control line 14 (FIG. 1) and the specimen holder device 11, these being omitted in FIG. 2.

The riser tube 24 (FIG. 1), extending downward to nearly the bottom of the storage vessel 22, is coaxially joined through a sealed screw nipple 49 with a riser tube 48 (FIG. 2) of poor heat conductance which extends through the carrier plate 33 and has its upper end connected to the inlet opening of the evaporator 2. The outlet opening of the evaporator winding communicates with an annular space 59 at the bottom of the insert container 3. From space 59 gas outlet line 15 of poor heat conductance leads to the inlet of the bifilar tube winding constituting the radiation shield 16. The gas outlet 17 of the radiation shield 16 is connected to the tube spiral 37.

Near the upper end of the riser tube 48 there is provided a gas-permeable enclosure filled with active carbon 51 which in cooled condition improves the vacuum inside the housing 19.

The upper end of the radiation shield 16 carries a ring-shaped extension 52 which is in heat-conducting connection with the bifilar tube winding of the shield 16. The upper end of extension 52 is joined with a closure piece 54 through an intermediate ring-shaped connecting piece 53 which is joined with the extension 52 preferably by a seal of immersion solder at 40. A radiation-protective tube 55 inserted in the closure piece 54 concentrically surrounds the charging tube 42. The extension 52 and consequently the radiation shield 16 are in heat-conducting connection with the protective tube 55 through the thermally conducting intermediate pieces 53 and 54. The radiation-protective tube 55, like the radiation shield 16, is surrounded by a superinsulation in form of a winding of metal-coated foils with intermediate air spaces.

The supply line 4 of the insert container 3 extends through the cooled plate 33 and terminates downwardly in a vacuum-jacketed flange 56. The supply tube 4 is joined with the carrier plate 33 by a solder junction at 58 and forms helical turns 57 in heat contact with the counterflow of gas in the gas outlet line 15 coming from the evaporator 2. The windings 57 of the gas supply line 4 are also in heat exchanging proximity to the counterflow of gas in the radiation shield 16. The connecting nipples and flanges 20, 38, 49 and 56 are inserted in the base plate 36.

The operation of the illustrated device is in accordance with the following method. In the assembled condition of the device, the interior of the jacket housing 19 is to be evacuated. Thereafter the insert container 3 is also evacuated. Then the charging device 5 is set to a superatmospheric pressure corresponding to the desired temperature, whereafter the heat transfer medium, for example gaseous helium, is supplied to the insert container. Thereafter the evaporator 2 is put in operation. This is done by operating the impeller pump 28 which inducts liquid helium from the storage vessel 22 through the riser lines 24 and 48 into the winding of the evaporator 2 where the liquid helium exaporates and produces the desired reduction in temperature. From the outlet of the evaporator tube the gas passes through the radiation shield 16 and the spiral 37 thus cooling the latter. From spiral 37 the gas flows through the regulating valve 26, the throttle valve 27 and the impeller pump 28 to the helium recovery system. When precooling the insert vessel with nitrogen, the spent nitrogen gas is preferably blown into the ambient atmosphere.

With the decrease in temperature, the pressure of the gaseous helium in the insert container 3 also decreases. This, however, is immediately compensated by automatic replenishment with gas from the supply control device 5. When ultimately the datum temperature is reached, and if this temperature is below the critical point of helium, the helium quantity contained in the container 3 condenses and forms a liquid bath whose level slowly rises as the device 5 continues to supply more helium gas. When the maximal level is reached, depending upon the chosen adjustment of the sensor 12, the gas supply is shut off by device 5. Now the temperature of the helium bath in container 3 is kept constant on the preselected value with the aid of the pressure-controlled regulating valve 26 which varies the cold producing power of the evaporator 2 accordingly.

If it is desired to operate the superconducting coil above the critical point at a temperature at which the heat exchange medium in the insert container 3 is not liquefied, the coolant throughput through the evaporator and thereby the temperature are to be adjusted and kept constant with the aid of an electromagnetic regulating valve controlled by an electrical sensor through an electrical regulating circuit in otherwise the same manner as described above. An electrical regulation, of course, may also be employed for operating below the critical temperature (5.2° K.).

As is manifested by the example of the illustrated embodiment described above, a device according to the invention can be given a compact design so as to occupy relatively little space, and need not be equipped with a radiation shield cooled with liquid nitrogen. The device can rather be operated with only one cooling medium, preferably helium, in any operating condition. However, the cheaper liquid nitrogen may be employed for precooling the device, such operation requiring only little expenditure and involving no aggrevation with respect to the subsequent helium operation.

Furthermore, the device can be cooled down to the desired operating temperature with largest feasible utilization of the cold content of the coolant (heat of evaporation and enthalpy of the cold gas).

The dead coolant volume of the device is very slight. Hence any losses of coolant, as will occur in the event the operation is interrupted or the coil goes normal, remain slight because they are limited essentially to evaporation or heating of the quantity of heat transfer medium remaining in the insert container, this quantity being slight in comparison with the amount of medium evaporating under such circumstances in the known bath cryostats. In a device according to the invention, the coolant loss in the evaporator circulation system is minimal and virtually negligible. Hence the consumption of coolant is considerably much smaller than with the known bath cryostats for superconducting coils.

Danger due to the transition from the super conducting state of the coil can be readily and reliably avoided by providing the interior space of the insert container with an over-pressure safety device such as an adjustable automatic relief valve as shown at 8, responding to a pressure slightly above the normal operating pressure. In the event the heat transfer medium evaporates abruptly, a pressure equalization is secured without dangerous increase in pressure, by discharging the excessive amounts of gas, preferably into a gas collecting chamber, such as the helium recovery plant mentioned above.

It is particularly favorable, as exemplified by the illustrated embodiment, to have the evaporator surround the coil winding at least about the outer periphery of the coil, and to surround the evaporator by a single piece or multiple-part cryogenically cooled radiation shield which is preferably connected to the gas outlet of the evaporator to form part of the circulation system for the cryogenic medium. This not only utilizes the cold content of the evaporator output gas in the radiation shield, but also affords the possibility of operating with only one cooling medium. The evaporator structure or the radiation shield or both are preferably made of a bifilar winding of tubular material and have their inlet and outlet openings located near the same axial end. It is further advisable to have the gas supply line 4 of the insert container 3 placed in proximity or thermal contact with the gas outlet line of the evaporator 2 and/or the radiation shield 16. By virtue of this feature, likewise embodied in the illustrated device, the gaseous heat exchange medium passes into the insert container in counterflow to the cold outlet gas, which secures a further reduction in coolant consumption.

For the various reasons explained, a cryostat device according to the invention also affords a reliable operation for prolonged periods of time substantially free of maintenance work.

According to the preferred embodiment of the invention illustrated, the free inner space of the superconducting coil may be sealed from the inner space which remains in the insert container between the evaporator and the superconducting coil. By thus providing a "hot hole" in the coil, any specimens introduced into the coil space by means of the device 11 can be kept at a higher temperature than the coil. If the interior coil space is filled with liquid helium, the device 11 for inserting and removing specimens is preferably designed as a gas lock.

As mentioned above, an apparatus according to the invention, embodying the principles and method described in the foregoing, may be given a variety of designs. Preferably, the evaporator structure is mounted in the surrounding housing or jacket of the cryostat device with the aid of holder members of poor heat conductance. The evaporator may be directly fastened to the enclosing housing, or the above-mentioned radiation shield may be interposed between evaporator and housing. The poor heat conductance materials of the holder members, as well as those mentioned elsewhere in this specification, may consist of insulating material of sufficient mechanical strength, for example resin-impregnated glass-fiber material and ceramic material, or it may consist of metal, such as low-conductance alloy steel, with or without interposed members of glass or other heat insulating material.

The above-described methods are not predicated upon using the particular design illustrated on the accompanying drawings but are analogously applicable with cryostats whose coil winding has a horizontal axis or can be turned during operation between vertical and horizontal positions. The inner space of the superconducting coil may either be left free for hot-hole operation or it may be filled with liquid helium or other cryogenic medium. Such a variety of possibilities is not available with the bath cryostats heretofore known.

Upon a study of this disclosure it will be obvious to those skilled in the art that the invention permits of various modifications and may be given embodiments other than particularly illustrated and described herein, without departing from the essential features of my invention and within the scope of the claims annexed hereto.

I claim:

1. With a superconducting magnet coil, in combination, a cryostat device for cooling the coil to a temperature below the critical value by evaporation of cryogenic medium, comprising an evacuable housing, an evacuable container enclosing said magnet coil, said container being inserted in said housing and forming therewith an annular interspace, an evaporator structure mounted in said container, and surrounding said magnet coil, supply means for gaseous heat exchange medium connected with said container for filling and replenishing it with said heat exchange medium, a cryogenic circulation system including said evaporator structure for evaporating cryogenic medium in said evaporator structure to cool said heat exchange medium in said container, said cryogenic medium in said evaporator structure being separated from the gaseous heat exchange medium in said container.

2. In a device according to claim 1, said supply means for gaseous heat exchange medium comprising adjustable pressure control means for maintaining the pressure of the gaseous heat exchange medium in said container substantially at an adjusted constant value.

3. In a device according to claim 1, said superconductive magnet coil being cylindrical, and said evaporator structure forming a bifilar helical winding of tubular material coaxially surrounding said coil.

4. In a device according to claim 3, said evaporator structure having inlet and outlet openings for cryogenic medium located near one axial end of said helical winding.

5. A device according to claim 1, comprising a heat radiation shield surrounding said evaporator structure and consisting of a bifilar helical winding of tubing which forms part of said circulation system.

6. In a device according to claim 1, said circulation system comprising a gas outlet line, and said supply means extending in heat-exchanging proximity and gas-counterflow relation to said outlet line, so that said heat exchange medium passing into said container is precooled from said gas outlet line.

7. In a device according to claim 1, said superconductive coil having a free inner space, and sealing means gas-tightly sealing said space from the interspace remaining in said container and containing said heat exchange medium.

8. In a device according to claim 1, said superconductive coil having an inner space accessible from the outside, and a charging device for inserting test objects from the outside into said inner space.

9. A device according to claim 1, comprising holder members of poor heat conductance rigidly mounting said insert container in said enclosing housing.

10. The method of cooling a superconducting coil to below the critical temperature by evaporation of cryogenic medium in a device having a housing and an insert container enclosing the coil within said housing, an evaporator being mounted in said container and forming part of a cryogenic circulation, which method comprises the steps of filling the insert container with gaseous heat exchange medium, evaporating a cryogenic liquid in the evaporator to cool the coil by transfer of heat through the heat exchange medium to the evaporator, and maintaining the gas pressure of the gaseous medium in the container at a given constant pressure during cooling of heat transfer medium and coil.

11. The method according to claim 10, which comprises cooling the heat exchange medium in the insert container to a datum temperature not lower than the boiling point of said medium, and then regulating the cooling power of the evaporator, in dependence upon a variable state of the medium in the container, so as to maintain the temperature of the superconducting coil substantially at a constant value.

12. The method according to claim 10, which comprises the antecedent step of first cooling the evaporator by a cryogenic medium having a higher boiling point than that of the afore-said cryogenic liquid, and subsequentially further reducing the temperature by evaporating said cryogenic liquid in the evaporator.

13. The method according to claim 12, wherein said cryogenic liquid is helium and said other cryogenic medium having the higher boiling point is nitrogen.

14. A device according to claim 1, comprising a supporting structure, said evacuable container with said coil and said evaporator structure being mounted on top of said structure, a vacuum pump communicating with said container and mounted on said structure, said supply means for gaseous medium comprising a storage vessel also mounted on said structure, said vacuum pump and said storage vessel being secured to said supporting structure beneath said container, and said cryogenic circulation system comprising said vacuum pump and a storage vessel for cryogenic liquid mounted within the confines of said supporting structure beneath said container.

References Cited
UNITED STATES PATENTS

| | | | |
|---|---|---|---|
| 3,095,711 | 7/1963 | Wurtz | 62—514 |
| 3,166,915 | 1/1965 | Klipping | 62—514 |
| 3,195,322 | 7/1965 | London | 62—467 |
| 3,206,938 | 9/1965 | Damsz | 62—55 |

LLOYD L. KING, *Primary Examiner.*

UNITED STATES PATENT OFFICE
CERTIFICATE OF CORRECTION

Patent No. 3,358,472　　　　　　　　　　　　December 19, 1967

Gustav Klipping

It is hereby certified that error appears in the above numbered patent requiring correction and that the said Letters Patent should read as corrected below.

In the heading to the printed specification, after line 7, insert -- Claims priority, application Germany, Jan. 22, 1965, M 63,882 --.

Signed and sealed this 11th day of February 1969.

(SEAL)
Attest:

Edward M. Fletcher, Jr.　　　　　　　　　　EDWARD J. BRENNER
Attesting Officer　　　　　　　　　　　　　Commissioner of Patents